United States Patent [19]

Nishida et al.

[11] Patent Number: 4,892,011
[45] Date of Patent: Jan. 9, 1990

[54] PLANETARY GEAR MECHANISM ON AN AUTOMATIC TRANSMISSION

[75] Inventors: Masaaki Nishida, Anjo; Youichi Hayakawa, Toyoake, both of Japan

[73] Assignee: Aisin-Warner Kabushiki Kaisha, Aichi, Japan

[21] Appl. No.: 181,148
[22] PCT Filed: Jul. 8, 1987
[86] PCT No.: PCT/JP87/00483
 § 371 Date: Mar. 1, 1988
 § 102(e) Date: Mar. 1, 1988
[87] PCT Pub. No.: WO88/00301
 PCT Pub. Date: Jan. 14, 1988

[30] Foreign Application Priority Data

Jul. 8, 1986 [JP] Japan .................. 61-161263

[51] Int. Cl.$^4$ ................. F16H 57/10; F16H 1/28
[52] U.S. Cl. ........................ 74/761; 74/801
[58] Field of Search ............. 74/801, 760, 761, 750 R

[56] References Cited

U.S. PATENT DOCUMENTS 2,827,805  3/1958  Miller .................... 74/761
2,894,415  7/1959  Miller .................... 74/761 X
3,216,270  11/1965 Nasvytis ................. 74/801 X
3,330,171  7/1967  Nasvytis ................. 74/801

FOREIGN PATENT DOCUMENTS 9-8019     5/1934  Japan .
45-29687  11/1970  Japan .
56-14903   4/1981  Japan .
62-93545   4/1987  Japan .

Primary Examiner—Dirk Wright
Attorney, Agent, or Firm—Wenderoth, Lind & Ponack

[57] ABSTRACT

In a dual planetary gear of an automatic transmission, tooth surface pressure generated at a relatively short pinion is decreased and distributed since the pinion is formed as a pair of pinions. These pinions can be pinions which mesh with a sun gear or pinions which mesh with a ring gear and a single first pinion. Torque exerted on the ring gear (or the sun gear) is transmitted to the sun gear (or the ring gear) through one point of contact (or two) between the sun gear and one pinion (or a pair of pinions) and the ring gear and two points of contact (or one) between a pair of pinions (or one pinion) and the ring gear.

13 Claims, 8 Drawing Sheets

PRIOR ART

FIG.5

| POSITION | | CLUTCH | | | | BRAKE | | | | O.W.C | | | |
|---|---|---|---|---|---|---|---|---|---|---|---|---|---|
| | | $C_0$ | $C_1$ | $C_2$ | $C_3$ | $B_1$ | $B_2$ | $B_3$ | $B_4$ | $F_0$ | $F_1$ | $F_2$ | $F_3$ |
| P | | | | | | | | | ○ | | | | |
| R | STOP | | | ○ | | | | ○ | ○ | | | | |
| N | | | | | | | | | ○ | | | | |
| D | 1ST | | ○ | | | | | | ○ | | | ○ | ○ |
| | 2ND | | ○ | | | | ○ | | ○ | | ○ | - | ○ |
| | 3RD | | ○ | | ○ | | ○ | | | | ○ | | |
| | 4TH | ○ | ○ | | ○ | | ○ | | | ○ | | | |
| | 5TH | ○ | | | ○ | ○ | ○ | | | | | | |
| 3 | 1ST | | ○ | | | | | | ○ | | | ○ | ○ |
| | 2ND | | ○ | | | | ○ | | ○ | | ○ | | ○ |
| | 3RD | ○ | ○ | | | | ○ | | | ○ | | | ○ |
| | 4TH | ○ | | | | ○ | ○ | | | | | | ○ |
| 2 | 1ST | | ○ | | | | | ○ | ○ | | | ○ | ○ |
| | 2ND | | ○ | | ○ | | | ○ | | | | ○ | |
| | (2ND) | | ○ | | | ○ | ○ | | ○ | | ○ | | ○ |
| | (3RD) | | ○ | | ○ | ○ | ○ | | | | ○ | | |
| 1 | 1ST | | ○ | | | | | ○ | ○ | | | ○ | ○ |
| | (2ND) | | ○ | | ○ | | | ○ | | | | ○ | |
| | (3RD) | | ○ | | ○ | ○ | ○ | | | | ○ | | |
| REMARKS | | ○ | ON | | | | | | | | | | |
| | | × | OFF | | | | | | | | | | |

FIG. 7

| POSITION | | CLUTCH | | | BRAKE | | | | O.W.C | | |
|---|---|---|---|---|---|---|---|---|---|---|---|
| | | $C_1$ | $C_2$ | $C_3$ | $B_1$ | $B_2$ | $B_3$ | $B_4$ | $F_1$ | $F_2$ | $F_3$ |
| P | | | | | | | | ○ | | | |
| R | STOP | | ○ | | | | ○ | ○ | | | |
| N | | | | | | | | ○ | | | |
| D | 1ST | ○ | | | | | | ○ | | ○ | ○ |
| | 2ND | ○ | | | | ○ | | ○ | ○ | | ○ |
| | 3RD | ○ | | ○ | | ○ | | | ○ | | |
| | 4TH | ○ | | ○ | ○ | | | | | | |
| 3 | 1ST | ○ | | | | | | ○ | | ○ | ○ |
| | 2ND | ○ | | | | ○ | | ○ | ○ | | ○ |
| | 3RD | ○ | | | | ○ | | ○ | | | ○ |
| 2 | 1ST | ○ | | | | | ○ | ○ | | ○ | ○ |
| | 2ND | ○ | | ○ | | | ○ | | | ○ | |
| | (2ND) | ○ | | | ○ | ○ | | ○ | ○ | | ○ |
| | (3RD) | ○ | | ○ | ○ | ○ | | | ○ | | |
| 1 | 1ST | ○ | | | | | ○ | ○ | | ○ | ○ |
| | (2ND) | ○ | | ○ | | ○ | | | | ○ | |
| | (3RD) | ○ | | ○ | ○ | ○ | | | ○ | | |
| REMARKS | | ○ | ON | | | | | | | | |
| | | × | OFF | | | | | | | | |

|  | $C_1$ | $C_2$ | $C_0$ | $B_1$ | $B_2$ | $B_3$ | $F_1$ | $F_2$ | $F_0$ |
|---|---|---|---|---|---|---|---|---|---|
| 1ST | ○ |  |  |  |  | △ |  | ○ |  |
| 2ND | ○ |  |  | △ | ○ |  | ○ |  |  |
| 3RD | ○ |  | ○ |  | ○ |  |  |  | ○ |
| 4TH |  |  | ○ | ○ |  |  |  |  |  |
| REV |  | ○ |  |  |  | ○ |  |  |  |

PLANETARY GEAR MECHANISM ON AN AUTOMATIC TRANSMISSION

BACKGROUND OF THE INVENTION

1. Field of the Invention

The present invention relates to an automatic transmission used with a torque converter, and in particular to a planetary gear mechanism.

Known automatic transmissions, in general, include only a single planetary gear mechanism having one pinion (a Simpson Type transmission, for example), at least one dual planetary gear mechanism having plural pinions (a Ravigneaux Type transmission for example) and the type proposed in the Japanese Pat. No. 60-230809, etc. The present invention relates to the latter, particularly to a dual planetary gear mechanism.

2. Description of the Prior Art

As shown in FIG. 11, a dual planetary gear generally comprises a sun gear S', a ring gear R', a first planetary pinion P', a second planetary pinion Q' and a carrier CR' supporting the first and second planetary pinions P' and Q'. Usually, these planetary pinions P', Q' each consist of a single component, respectively. The planetary pinion P' and Q' mesh with each other. And P', Q' also mesh with the sun gear S' or the ring gear R'.

A dual planetary gear unit is often used in combination with a single planetary gear unit. For example, in the Ravigneaux Type transmission, sun gears are respectively incorporated in each single and dual planetary gear mechanism; a second pinion, and a common ring gear and carrier are used in the single and dual gear units. One of the sun gears, a common (the second) pinion and the ring gear make up a single planetary gear unit; another sun gear, the common pinion and the first pinion which is disposed between the "another sun gear" and the common pinion make up a dual planetary gear unit. And, a transmission proposed by the applicant of the present invention, ring gears are respectively incorporated in each single and dual planetary gear mechanism; the first pinion, and a common sun gear and carrier are used in the single and dual gear unit. One of the ring gears, a common (the first) pinion and a sun gear make up a single planetary gear unit; another ring gear, the common pinion and the second pinion which is disposed between the "another ring gear" and the common pinion make up a dual planetary gear unit.

Accordingly the first pinion (the common pinion) can be axially long. However, the second pinion cannot be axially long because of the interference of the sun gear or the ring gear of the single planetary gear unit. Due to the above, cog pressure generated between the second pinion and the sun gear (Ravigneaux Type) or the ring gear (proposed) is much higher than that generated between the common pinion and the ring gear (Ravigneaux Type) or the sun gear (proposed), and so much pressure may limit the total torque transmission.

To reduce the cog pressure, the planetary gear unit is made wider or the number of pairs of the pinions is increased (for example, 4 pairs, etc.). However, such results in the size of whole transmission becoming relatively large. Consequently, the above solution cannot meet a requirement of a compact transmission for a front-mounted engine front-wheel drive car.

SUMMARY OF THE INVENTION

The object of the present invention is to provide a planetary gear mechanism in an automatic transmission which resolves the above-mentioned problems by decreasing cog pressure on the shorter pinion without making the transmission excessively large.

According to the object of the present invention, a first pinion (P) meshes with second pinions ($Q_1$), ($Q_2$), while the first pinion (P) also meshes with a sun gear (S) while second pinions ($Q_1$) and ($Q_2$) mesh with a ring gear ($R_2$).

Based on the above structure, torque of the ring gear ($R_2$) (or the sun gear (S)) is transmitted to the sun gear (S) (or the ring gear ($R_2$)) through the pinions (P), (Q). Since the sun gear (S) contacts the pinion (P), and the other pinions ($Q_1$), ($Q_2$) contact the gear ring ($R_2$), respectively, the contact pressure generated while the ring gear ($R_2$) contacts the other pinions ($Q_1$), ($Q_2$) is dispersed.

The structure of the present invention is such that, the pinion (P) (or (Q), and the other pinions ($Q_1$) and ($Q_2$) (or ($P_1$, $P_2$)) mesh, so that the axial length of the "other pinions" is shorter than the pinion (P) (or (Q)) mentioned above, and torque transmitted to the "other pinion" generates a large tooth surface pressure which is dispersed. Furthermore, the tooth surface pressure per each of the "other pinions" can be decreased and torque applied to the portion bearing a large tooth surface pressure is dispersed; as a result, tooth surface pressure on each gear of the whole gear unit is pro rata reduced. Consequently, the width of the gear unit is kept to a minimum, the number of pairs of pinions comprising the first and second pinions is small, and the automatic transmission is relatively compact. Still further, the total torque capacity is increased.

If the above-mentioned "pinion (P)" is defined as the first pinion meshing with the sun gear (S), and the abovementioned "other pinions ($Q_1$), ($Q_2$)" are defined as the second pinions meshing with the ring gear ($R_2$) then such a structure is applicable to the automatic transmission which the applicant of the present invention has proposed. In this automatic transmission, the dispersion of torque by the two pinions is performed effectively during speed running during which the pinions are also running for long periods of time, and during reverse running in which the pinions have to bear a high load. Further, the two pinions ($Q_1$) and ($Q_2$) are so located toward the outer diameter side that the disposition of the pinion pairs becomes easy.

On the other hand, if the above-mentioned "pinion (P)" is defined as a second pinion (Q) meshing with the ring gear (R), and the above-mentioned "other pinions ($Q_1$) and ($Q_2$)" are defined as first pinions ($P_1$), ($P_2$) meshing with a sun gear ($S_2$) then such a structure is applicable to a Ravigneaux type or a modified Ravigneaux Type transmission. Tooth surface pressure applied to a sun gear having a small diameter is dispersed and such structure is particularly effective during low speed running during which a large amount of torque is transmitted.

Furthermore, the other pinions ($Q_1$), ($Q_2$), (or $P_1$, $P_2$) are supported by a lubricated (oil-film) shaft (43) (refer to FIG. 2) so as to rotate freely thereon. This can disperse the tooth surface pressure of each pinion, and the above-mentioned effects are surely and reliably obtained.

All symbols in parentheses above are provided for reference purposes with respect to FIG. 1, and do not limit the claims.

BRIEF DESCRIPTION OF THE DRAWINGS

In the accompanying drawings,

FIG. 5 is a table of operation;

FIG. 7 is a table of operation;

DETAILED DESCRIPTION OF THE PREFERRED EMBODIMENTS

The following is a description of preferred embodiments in accordance with the present invention.

Figure 4:
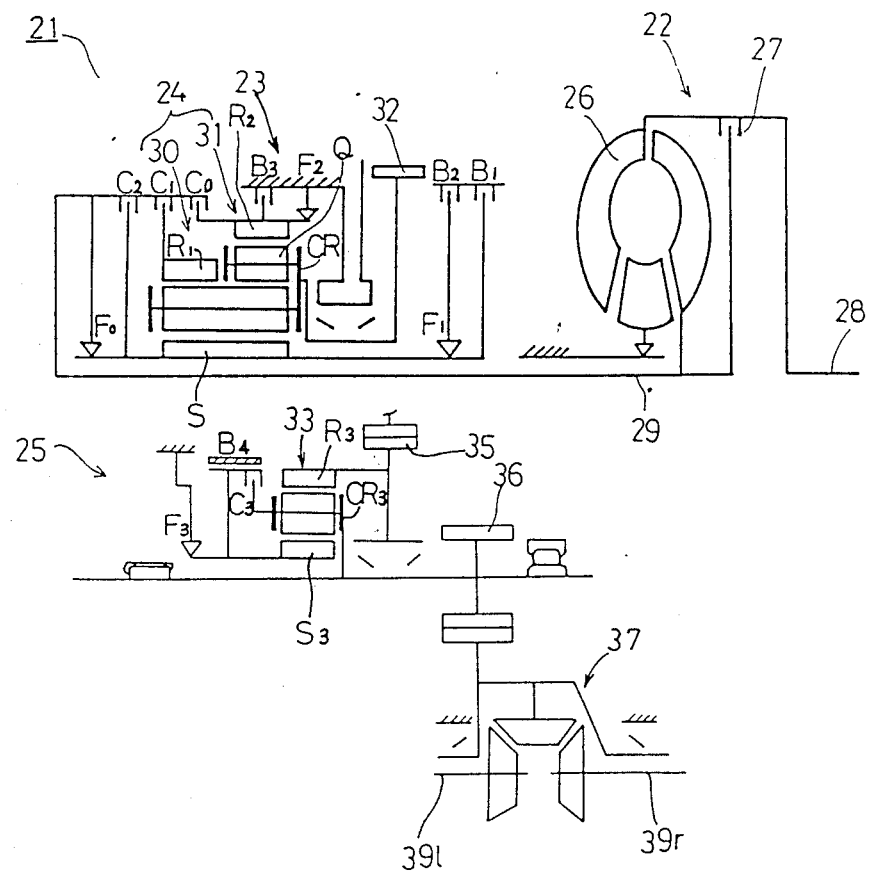
FIG. 4 is a schematic diagram of an automatic transmission to which the present invention is applicable.

A five speed automatic transmission 21 comprises a torque converter portion 22, a four speed automatic transmission mechanism portion 23 and an underdrive mechanism portion 25, as shown in FIG. 4.

The torque converter portion 22 has a torque converter 26 and a lock-up clutch 27. An engine crankshaft 28 is connected to an input shaft 29 with oil by the torque converter 26 or via a mechanical coupling by the lock-up clutch 27.

The four speed automatic transmission mechanism portion 23 includes a single planetary gear unit 30 and a dual planetary gear unit 31. Each gear unit has a carrier CR and a sun gear S. The carriers CR are connected to one another to form an integrated body; and the sun gears are connected to one another to form an integrated body, also. Still further, the input shaft 29 is coupled with the ring gear $R_1$ of the single planetary gear unit 30 through the first (forward) clutch $C_1$ and is also coupled with the sun gear S through the second (direct) clutch $C_2$. The sun gear S is braked directly by the first (2nd coast) brake $B_1$ and the rotation thereof in one direction is regulated by the second (2nd) brake $B_2$ through a first one-way clutch $F_1$. The ring gear $R_2$ of the dual planetary gear unit 31 is braked directly by the third (1st & Rev) brake $B_3$ and the rotation of the ring gear $R_2$ in one direction is regulated by a second one-way clutch $F_2$. Furthermore, the input shaft 29 is connected with said ring gear $R_2$ of the dual planetary gear 31 through a third (overdrive) clutch $C_0$ and a third one-way clutch $F_0$ is operatively connected between the input shaft 29 and the sun gear S in order to limit the rotation of the sun gear S to that of the input shaft 29. Further, the carrier CR is connected with the counterdrive gear 32 which is the output member of the four speed automatic transmission mechanism portion 23.

On the other hand, the underdrive mechanism portion 25 comprises a single planetary gear unit 33 including a ring gear $R_3$ which is connected with a counterdriven gear 35 which is always engaged with the counterdrive gear 32; and a carrier $CR_3$ is connected with the output pinion 36. Further, the rotation of the sun gear $S_3$ in one direction is regulated by the fourth one-way clutch $F_3$; and the sun gear $S_3$ is braked by the fourth (underdrive) brake $B_4$ and is connected with the carrier $CR_3$ through the fourth (underdrive direct) clutch $C_3$.

As for the output pinion 36, it is connected with the right and left axles 39r, 39 through the differential device 37.

Figure 1:
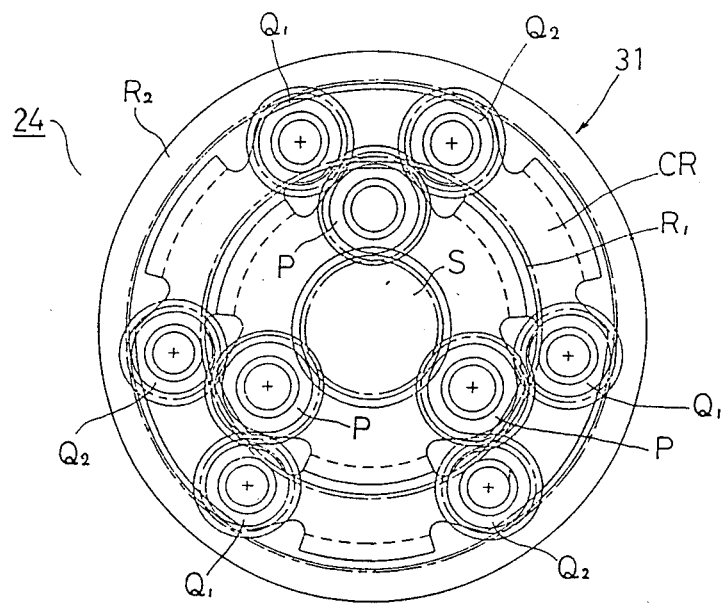
FIG. 1 is a front view, in elevation, of a gear unit according to the present invention.
Figure 11:
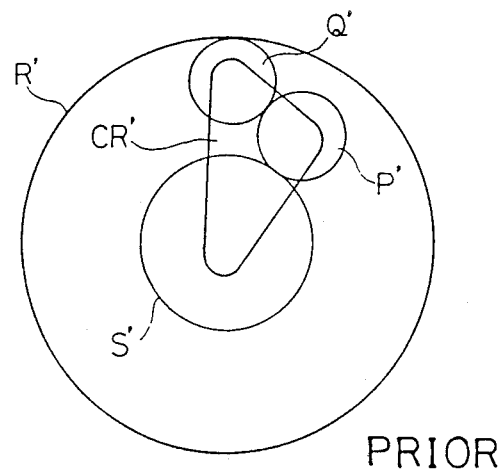
FIG. 11 is a front view, in elevation, of a dual planetary gear of the prior art.
Figure 2:
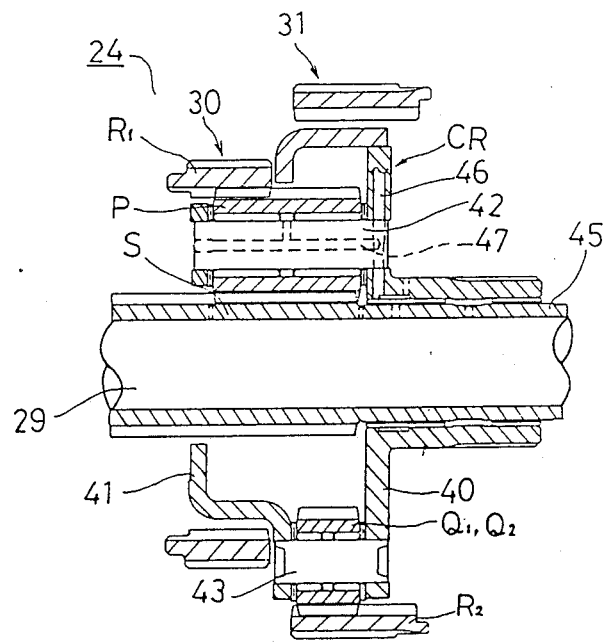
FIG. 2 is a cross-sectional view of the gear unit.

And, in the planetary gear unit 24, the sun gear S and the first pinion P are elements common to the single planetary gear 30 and dual planetary gear 31 as shown in FIG. 1 and FIG. 2, the ring gears $R_1$ and $R_2$ are respective elements of planetary gear units 30, 31, and the second pinion Q is an exclusive element of the dual planetary gear 31. Due to the above structure, the common sun gear S and first pinion P are axially long as to extend through both planetary gear units 30, 31 while the ring gears $R_1$, $R_2$ and the second pinion Q are axially short. A carrier CR comprises two side plates 40, 41, a supporting shaft 42 of the first pinion P which extends between the side plates and a support shaft 43 of the second pinion Q. And, the side plate 40 is freely supported for rotation by a needle bearing disposed on a sleeve 45 on which the sun gear S is formed. On the carrier are supported three pairs of pinions each of which comprises the first and second pinions. Each pair of pinions comprises one first pinion P and two second pinions $Q_1$, $Q_2$ meshing with the first pinion P. Furthermore, the side plate 40 of the carrier has an oil path 46 to pass lubricant to the needle bearing supporting the first pinion P which lubricant flows through an oil path 47 formed in the supporting shaft 42. In addition, lubricant can be supplied to a needle bearing supporting the second pinion Q (not shown).

Figure 3:
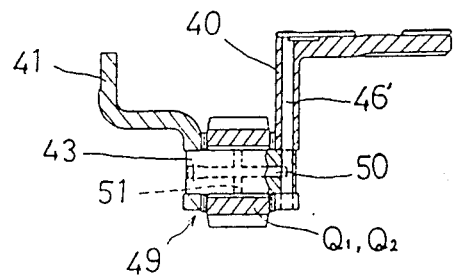
FIG. 3 is a cross-sectional view of a pinion portion in a partially modified embodiment.

A partially modified embodiment is shown in FIG. 3. In this embodiment, the tooth surface pressure at the second pinions $Q_1$, $Q_2$ is equilibrated by a load equilibrium mechanism. This is to say, the supporting shafts 43 of the second pinions $Q_1$, $Q_2$ each have an oil path 50 and a narrower oil path 51, and lubricant is supplied to the oil path 50 through an oil path 46' formed in the side plate 40. Consequently, the second pinions of all the pairs are provided with elastic support due to an oil film; and, based on the oil film pressure at the shafts 43, force applied to both pinions $Q_1$, $Q_2$ is distributed equally.

The load equilibrium mechanism is of course applicable to the first pinion P.

Now, the operation of this embodiment will be described. A five speed automatic transmission 21 provides the first to the fifth speed of each range set by a manual valve. At each range set by the manual valve, the clutches $C_0$–$C_3$, the brakes $B_1$–$B_4$, and the one-way clutches $F_0$–$F_3$ operate in accordance with FIG. 5, and plural speeds are obtained in each range (P, R, D, 3, 2, 1) set by the manual valve.

At the first speed in D range, the first forward clutch C1 is engaged and the fourth brake $B_4$ operates. The rotation of the input shaft 29 is transmitted to the ring gear R1 of the single unit 30 through the clutch C1. At this time, since the ring gear $R_2$ of the dual unit 31 is restrained by the second one-way clutch $F_2$, the ring gear $R_2$ rotates the sun gear S in a reverse direction without load through the first pinion P and second pinion Q, and the common carrier CR is rotated in a normal direction at a retarded speed. The rotation is transmitted from the counterdrive gear 32 to the counterdriven gear 35 of the underdrive mechanism (U/D) 25. The underdrive mechanism 25 is in an "underdrive condition" due to the operation of the four the brake $B_4$ and the fourth one-way clutch $F_3$. Consequently, the automatic transmission 21 outputs the first (1st) speed due to the combination of the first speed of the four speed automatic transmission 23 and the underdrive condition of the underdrive mechanism 25.

At the second speed in D range, the second brake $B_2$ is operated in addition to the engagement of the first forward clutch $C_1$. Then, the rotation of the sun gear S is restrained by the first one-way clutch $F_1$ based on the second brake $B_2$; accordingly, the rotation of the ring gear $R_1$ transmitted from the input shaft 29 rotates the ring gear $R_2$ of the dual unit 31 in a normal direction without load and rotates the common carrier CR in a normal direction at a reduced speed. This rotation is transmitted from the counterdrive gear 32 to the counterdriven gear 35 of the underdrive mechanism 25. The underdrive mechanism 25 assumes the "underdrive condition". Consequently, the automatic transmission 21 outputs the second speed due to the combination of the second speed of the four speed automatic transmission 23 and the underdrive condition of the underdrive mechanism 25.

At the third speed in D range, the four speed automatic transmission 23 is kept under the second speed. The fourth brake $B_4$ is released and the fourth clutch $C_3$ is engaged. The underdrive mechanism assumes a direct coupling condition. Consequently, the automatic transmission 21 outputs the third speed due to the combination of the second speed of the four speed automatic transmission 23 and the direct coupling of the underdrive mechanism 25.

At the fourth speed in D range, the first forward clutch C1, the fourth clutch C3 and the third clutch $C_0$ are engaged in addition to the operation of second brake $B_2$. Then, the rotation of the input shaft 29 is transmitted to the ring gear R1 of the single unit 30 through the clutch C1. At this time, the rotation of input shaft 29 is transmitted to the ring gear R2 of the dual unit 31 through clutch $C_0$. Then, components of planetary gear units 30 and 31 rotate together, and, via the carrier CR, the rotation of the input shaft 29 is transmitted to the counterdrive gear 32 to rotate gear 32 at the same speed as the input shaft 29. The rotation of the counterdrive gear 32 is combined with the direct coupling condition of the underdrive mechanism 25, and thus, the fourth speed which is the same as the rotation speed of the input shaft 29 is output by the automatic transmission 21.

At the fifth speed in D range, the first forward clutch $C_1$ is released and the first brake $B_1$ operates. Then, the rotation of the input shaft 29 is transmitted to ring gear $R_2$ of the dual unit 31 through the clutch $C_0$. At this time, since the sun gear S is restrained, the rotation of the input shaft 29 rotates the ring gear R1 of the single unit rapidly without load. Then, the carrier CR rotates rapidly, and such high speed rotation is transmitted to the counterdrive gear 32 as an "overdrive". The rotation is transmitted by counterdrive gear 32 to counterdriven gear 35 of underdrive mechanism (U/D) 25. Consequently, the automatic transmission 21 outputs the fifth speed due to the combination of the overdrive condition and the direct coupling of the underdrive mechanism 25.

During usual high speed running, the automatic transmission assumes the "overdrive" condition, and this condition is maintained for a long period of time. During this time, the torque exerted on the ring gear $R_2$ of the dual unit 31 is transmitted to the sun gear S through the second pinions $Q_1$, $Q_2$, and the first pinion P. And, because the sun gear is restrained, the carrier CR rotates in reaction to the sun gear being restrained. The contact surface of the first pinion and the sun gear S is large because they are axially long. On the other hand, the contact surfaces of the second pinions $Q_1$, $Q_2$ and the ring gear $R_2$ are small because the second pinions are axially short compared to the first pinion P and the sun gear S. The second pinion Q comprises two pinions $Q_1$ and $Q_2$ for each first pinion P consisting of one pinion. Accordingly, the torque between the ring gear $R_2$ and the second pinion Q is divided over the two pinions. This means that the tooth surface pressure per pinion becomes low.

Furthermore, if the load equilibrium mechanism 49 is provided for the second pinions $Q_1$ and $Q_2$ as shown in FIG. 3, the pressure applied to the tooth surface of the pinions $Q_1$, $Q_2$ is balanced, so that an overload exerted on one pinion due to a defective condition during operation, etc., and a decrease in tooth surface pressure due to torque dispersion are prevented.

When the manual valve is shifted from N range to R range, in the automatic transmission 21 the second clutch $C_2$ is engaged and third brake $B_3$ operates. The rotation of the input shaft 29 is transmitted to the sun gear S through the clutch $C_2$. Under this condition, via the third brake $B_3$, the ring gear $R_2$ of the dual unit 31 is restrained, and the ring gear R1 of the single unit 30 rotates in a reverse direction. The carrier CR also rotates in a reverse direction. This reverse rotation is transmitted through the counterdrive gear 32 to the underdrive mechanism 25 which is under the "underdrive condition". At this time, the torque from the sun gear S is transmitted to the ring gear $R_2$ of the dual unit 31, as in the overdrive condition, and the second pinions $Q_1$, $Q_2$ contact the ring gear $R_2$ at two points for each pair of the pinions P, Q. This means that tooth surface pressure is divided into two contact points, so that high pressure is not generated.

When the manual valve 10 is shifted to 3 range by the manipulation of a shift lever or by a switch, 1st and 2nd speeds are the same as those in D range but 3rd and 4th speeds are provided with a different gear ratio. That is to say, at 3rd speed in 3 range, in the automatic transmission 21, the first clutch $C_1$ and the third clutch $C_0$ are engaged, and the second $B_2$ and the fourth brake $B_4$ are operated. The four speed automatic transmission mechanism 23 assumes the direct coupling condition and the underdrive mechanism 25 assumes the underdrive condition. Then the 3rd speed of 3 range is output.

At the 4th speed in 3 range, in the automatic transmission 21, the third clutch $C_0$ is engaged, and the first, second and fourth brake (B1, B2 and B4) are operated. Then, the four speed automatic transmission mechanism 23 assumes the overdrive condition and the underdrive mechanism 25 assumes the underdrive condition.

When the manual valve is shifted to 2 range, at the first speed in 2 range, the third brake B3 operates in addition to the operation at 1st speed in D range. Due to the operation described above, the gear ratio is the same as in 1st speed in D range; however, when an engine brake (reversal of input and output) is applied, this 1st speed of 2 range is maintained because the ring gear R2 is restrained by the brake B3 and, contrary to the first speed in D range, the transmission is disconnected by the one-way clutch $F_2$.

At 2nd speed in 2 range, the first and the fourth clutch ($C_1$ and $C_3$) are engaged and the third brake is operated. Then, the four speed automatic transmission mechanism 23 assumes a 1st speed condition and the underdrive mechanism 25 assumes the direct coupling condition. As a whole, 2nd speed in 2 range is output. At this time, as in the 1st speed, the third brake operates and the engine brake maintains the 2nd speed. At 2 range, it is possible to obtain 2nd and 3rd speeds like D range as shown in the parentheses.

Furthermore, in 1 range, 1st speed is established in the same manner as in 2 range. As shown in the parentheses, 2nd speed as in 2 range, and 3rd speed, as in D range can be obtained.

In addition to the above-described embodiment, a partially modified embodiment employable in a three speed automatic transmission is described below.

Figure 6:
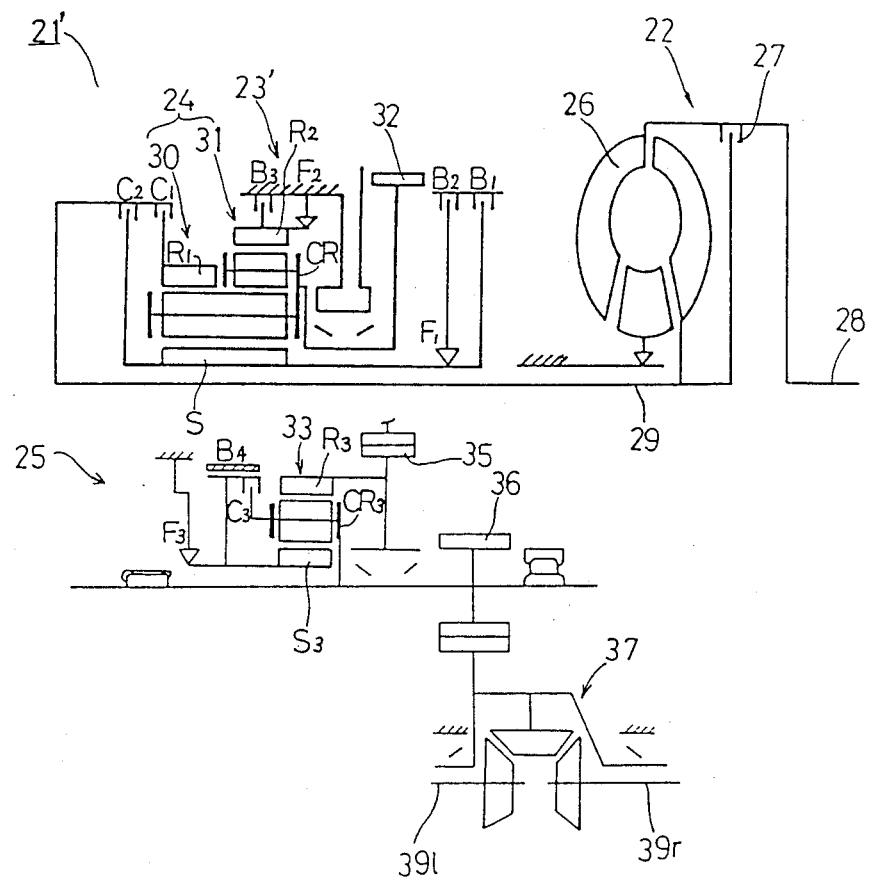
FIG. 6 is a schematic view of another automatic transmission to which the present invention is applicable.

In the three speed automatic transmission mechanism 23', as shown in FIG. 6, the third clutch $C_0$ and the third one-way clutch $F_0$ of the above embodiment are eliminated; however, the mechanism 23' remains coupled with the underdrive mechanism 25 as in the previous embodiment. By employing such a transmission mechanism, a forward four speed automatic transmission 21' is obtainable. That is to say, as shown in the operation table of FIG. 7. the previously described clutch $C_0$, the one way clutch $F_0$, and the fifth speed in D range and the fourth speed in 3 range are eliminated.

In the automatic transmission 21', a gear unit 24 comprises a single planetary gear unit 30 and a dual planetary gear unit 31 which are the same as those described with reference to the previous embodiment, as shown in FIG. 1, FIG. 2 and FIG. 3. The contact between the ring gear $R_2$ and the second pinion $Q_1$, $Q_2$ is at two points, so that tooth surface pressure is dispersed.

The next embodiment involves the first pinion.

Figures 8, 10:
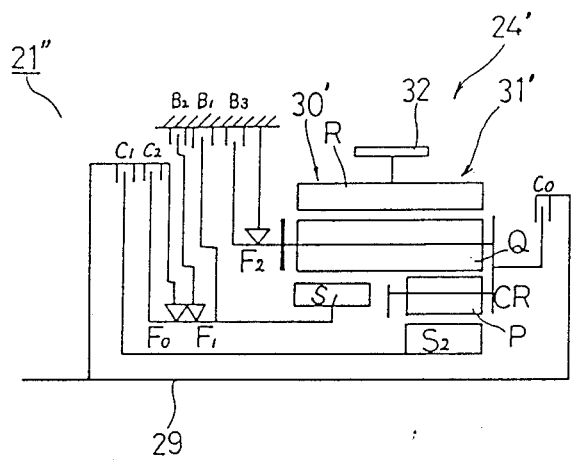
FIG. 8 is a schematic view of another type of automatic transmission to which the present invention is applicable.
FIG. 10 is a table of operation.

An automatic transmission mechanism 21", as shown in FIG. 8, comprises a planetary gear unit 24' having one single planetary gear unit 30' and one dual planetary gear unit 31'. The planetary gear unit 24' includes respective sun gears $S_1$, $S_2$, and a common second pinion Q, ring gear R and carrier CR. The sun gear $S_1$, the second pinion Q and the ring gear R make up the single planetary gear 30' while the sun gear $S_2$, the second pinion Q and the first pinion P make up the dual planetary gear 31'. The first pinion P is located between the sun gear $S_2$ and the second pinion Q. The input shaft 29 is connected to the sun gear $S_2$ of the dual planetary gear 31' through the first clutch $C_1$, to the sun gear $S_1$ of the single planetary gear 30' through the second clutch $C_2$ and the one-way clutch $F_0$, and to the carrier through the third clutch $C_0$. The output member 32 is connected to the ring gear R.

Figure 9:
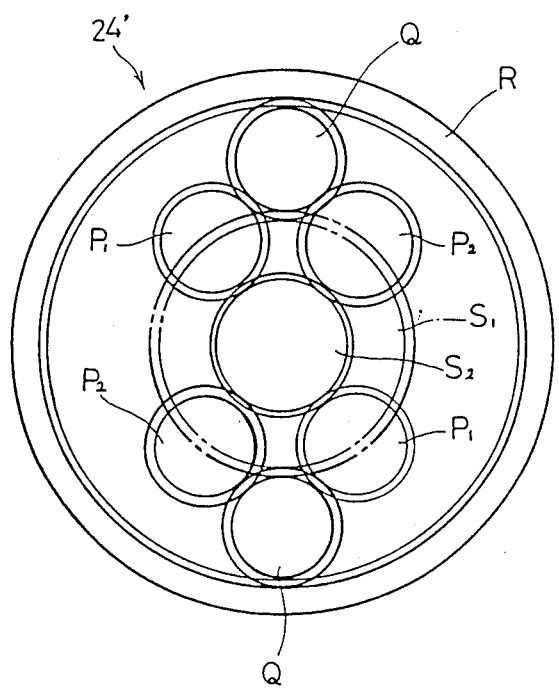
FIG. 9 is a front view, in elevation, of a gear unit of the present invention employed in the automatic transmission shown in FIG. 8.

Furthermore, as shown in FIG. 9, the structure in which the second pinion Q meshes with the ring gear R, and the first pinion $P_1$, $P_2$ (meshing with the sun gear $S_2$) meshes with the second pinion is axially long.

Based on the above structure, in the automatic transmission mechanism 21", as shown in the operation table of FIG. 10, the first to the fourth speed and reverse are obtained due to the state of each clutch $C_1$, $C_2$, $C_3$, $C_0$, each brake $B_1$, $B_2$, $B_3$, and each one-way clutch $F_1$, $F_2$, $F_0$. In FIG. 10 a mark represents the engagement of a clutch, and the operation of a one-way clutch, and a mark represents only a coasting operative state.

Namely, at the first speed, the first clutch is engaged, the rotation of the input shaft 29 transmitted to the sung gear $S_2$ of the dual planetary gear 31' transmitted to the ring gear R through the first and second pinion P, Q because the carrier CR is restrained by the one-way clutch $F_2$ or the third brake $B_3$. At this time, a comparatively large amount of torque is transmitted at the first speed, so that a large tangential force is applied to the sun gear $S_2$ having a small diameter. On the other hand, in each pair of pinions, the first pinion comprises two pinions $P_1$, $P_2$; consequently, torque is dispersed and the tooth surface pressure between the sun gear $S_2$ and the first pinions $P_1$, $P_2$ is not excessive in spite of the structure being axially long. And, since the ring gear R and the second pinion Q are axially long, the tooth surface pressure does not become overly excessive.

At the second speed, the first clutch $C_1$, the first brake $B_1$ or the second brake $B_2$ are in an operative state. Accordingly, the rotation of the input shaft 29 is transmitted to the second pinion Q through the first pinion $P_1$ and $P_2$. Since the sun gear $S_1$ of the single planetary gear 30' is restrained by the second brake $B_2$ and the one-way clutch $F_1$, or the first brake $B_1$, the pinion Q is restrained from self-rotation, and, on the other hand, the carrier CR and the ring gear 32 rotate.

At the third speed, the first clutch $C_1$ and the third clutch $C_0$ are engaged. Then, the sun gear $S_1$ and the carrier CR rotate at the same speed, and the components of the gear unit 24' rotate together.

Furthermore, at the fourth speed, the third clutch $C_0$ and the first brake $B_1$ are in an operative state. Thus, the rotation of the input shaft 29 is transmitted to the carrier CR, and since the rotation of the sun gear $S_1$ of the single planetary gear 30' is restrained, the second pinion rotates and undergoes orbital movement. Such rotation is transmitted as an overdrive to the ring gear.

In reverse, the second clutch $C_2$ and the third brake $B_3$ are in an operative state. The rotation of the input shaft 29 is transmitted to the ring gear R through the second pinion Q because the rotation, around of the sun gear $S_1$, of the single planetary gear 30' is restrained.

The present invention is applicable to an automatic transmission mechanism having gear unit(s), such as the four and three speed automatic transmission mechanisms shown in FIG. 4 and FIG. 6, and the four speed automatic transmission shown in FIG. 8, and Ravigneaux Type transmission mechanisms having three speeds.

What is claimed is:

1. A planetary gear set comprising:
   a dual planetary gear unit including a sun gear, a ring gear, a first planetary pinion means operatively disposed between said sun gear and said ring gear and comprising at least one first pinion for transmitting torque between said sun gear and said ring gear, a second planetary pinion means operatively disposed between said sun gear and said ring gear and comprising a respective pair of circumferentially spaced second pinions associated with each said first pinion for also transmitting torque between said sun gear and said ring gear, and a carrier to which said second pinions are rotatably mounted,
   said carrier rotatably supported in said gear set relative to said sun gear,
   each said first pinion meshing with only the respective pair of second pinions associated therewith and one of said sun gear and said ring gear in said dual planetary gear unit, and each said respective pair of second pinions meshing with only the first pinion associated therewith and the other of said sun gear and said ring gear in said dual planetary gear unit.

2. A planetary gear set as claimed in claim 1, wherein each said respective pair of second pinions meshes with said ring gear, and each said first pinion meshes with said sun gear, and further comprising a single planetary gear unit including said sun gear, said first planetary pinion means, said carrier, and a respective ring gear rotatable in said single planetary gear unit relative to the ring gear of said dual planetary gear unit, and in said single planetary gear unit, each said first pinion extending between and meshing with said sun gear and said respective ring gear of the single planetary gear unit.

3. A planetary gear set as claimed in claim 1, wherein each said respective pair of second pinions meshes with said sun gear, and each said first pinion meshes with said ring gear, and further comprising a single planetary gear unit including said ring gear, said first planetary pinion means, said carrier, and a respective sun gear rotatable in said single planetary gear unit relative to the sun gear of said dual planetary gear unit, and in said single planetary gear unit, each said first pinion extending between and meshing with said ring gear and said respective sun gear of said single planetary gear unit.

4. A planetary gear set as claimed in claim 1, wherein said carrier comprises a respective support shaft on which each of said second pinions is rotatably mounted, and a film of oil is disposed between each of said second pinions and the support shafts on which the second pinions are mounted.

5. A planetary gear set as claimed in claim 1, wherein said carrier comprises a respective support shaft on which each of said second pinions is rotatably mounted, each of said support shafts defining a lubricating passage through which lubricant is passable to form a film between each of said second pinions and the support shafts on which the second pinions are mounted.

6. A planetary gear set as claimed in claim 2, wherein the gear teeth of said sun gear have an axial length that is substantially the same as the axial length of the gear teeth of each said first pinion and substantially greater than the axial length of the gear teeth of any of said ring gears and said second pinions.

7. A planetary gear set as claimed in claim 3, wherein the gear teeth of said ring have an axial length that is substantially the same as the axial length of the gear teeth of each said first pinion and substantially greater than the axial length of the gear teeth of any of said sun gear and said second pinions.

8. An automatic transmission mechanism comprising:
a dual planetary gear unit including a sun gear, a ring gear, a first planetary pinion means operatively disposed between said sun gear and said ring gear and comprising at least one first pinion for transmitting torque between said sun gear and said ring gear, a second planetary pinion means operatively disposed between said sun gear and said ring gear and comprising a respective pair of circumferentially spaced second pinions associated with each said first pinion for transmitting torque between said sun gear and said ring gear, and a carrier to which said second pinions are rotatably mounted, said carrier rotatably supported in said gear set relative to said sun gear, each said first pinion meshing with only the respective pair of second pinions associated therewith and said sun gear in said dual planetary gear unit, and each said respective pair of second pinions meshing with only the first pinion associated therewith and said ring gear in said dual planetary gear unit;

a single planetary gear unit including a sun gear integral with the sun gear of said dual planetary gear unit, at least one planetary pinion integral with each said first pinion of said dual planetary gear unit, respectively, a carrier integral with the carrier of said dual planetary gear unit and to which each said planetary pinion of said single planetary gear unit is rotatably mounted, and a respective ring gear rotatable in said planetary gear unit relative to the ring gear of said dual planetary gear unit, each said at least one planetary pinion of the single planetary gear unit meshing with said sun gear integral with the sun gear of said dual planetary gear unit and with said respective ring gear;

a first brake operatively connected to said integral sun gears for braking rotation of said integral sun gears, a second brake connected to said integral sun gears; and a one-way clutch operatively connected to said integral sung gears between said integral sun gears and said second brake for limiting rotation of said sun gears to one direction;

a third brake operatively connected to the ring gear of said dual planetary gear unit for braking rotation of the ring gear of said dual planetary gear unit;

a second one-way clutch operatively connected to the ring gear of said dual planetary gear unit for limiting rotation of the ring gear of said dual planetary gear unit to one direction;

a rotatable element integral with said integral carriers for transmitting a rotational output of the automatic transmission mechanism;

an input member operatively connected to the ring gear of said single planetary gear unit and to the integral sun gears for transmitting an input rotation to the automatic transmission mechanism;

a first clutch connected between said input member and the ring gear of said single planetary gear unit; and a second clutch connected between said input member and the integral sun gears.

9. An automatic transmission mechanism as claimed in claim 8, wherein said input member is also operatively connected to the ring gear of said dual planetary gear unit, and further comprising a third clutch connected between said input member and the ring gear of said dual planetary gear unit.

10. An automatic transmission mechanism portion comprising:
a dual planetary gear unit including a sun gear, a ring gear, a first planetary pinion means operatively disposed between said sun gear and said ring gear and comprising at least one first pinion for transmitting torque between said sun gear and said ring gear, a second planetary pinion means operatively disposed between said sun gear and said ring gear and comprising a respective pair of circumferentially spaced second pinions associated with each said first pinion for transmitting torque between said sun gear and said ring gear, and a carrier to which said second pinions are rotatably mounted, said carrier rotatably supported in said gear set relative to said sun gear, each said first pinion meshing with only the respective pair of second pinions associated therewith and said ring gear in said dual planetary gear unit, and each said respective pair of second pinions meshing with only the first pinion associated therewith and said sun gear in said dual planetary gear unit;

a single planetary gear unit including a respective sun gear rotatable in the single planetary gear unit relative to the sun gear of said dual planetary gear unit, at least one planetary pinion integral with each of said first pinion of said dual planetary gear unit, respectively, a carrier integral with the carrier of said dual planetary gear unit and to which each said planetary pinion of said single planetary gear unit is rotatably mounted, and a ring gear integral with the ring gear of said dual planetary gear unit;

a first brake operatively connected to the sun gear of said single planetary gear unit for braking rotation of the sun gear of said single planetary gear unit;

a second brake connected to the sun gear of said single planetary gear unit, and a first one-way clutch operatively connected to the sun gear of said single planetary gear unit between said second brake and the sun gear of said single planetary gear unit for limiting rotation of the sun gear of said single planetary gear unit to one direction;

a third brake operatively connected to the pinions meshing with said integral ring gears for braking the rotation of the pinions meshing with said integral ring gears;

a rotatable counterdrive gear connected to said integral ring gears for transmitting an output of said transmission mechanism portion;

an input member operatively connected to the sun gear of said dual planetary gear unit, to the sun gear of said single planetary gear unit and to the integral carriers;

a first clutch connected between said input member and the sun gear of said dual planetary gear unit;

a second clutch connected between said input member and the sun gear of said single planetary gear unit; and a third clutch connected between the integral carriers and said input member.

11. An automatic transmission mechanism portion as claimed in claim 1, wherein each said first pinion is rotatably mounted to said carrier.

12. An automatic transmission mechanism portion as claimed in claim 8, wherein the integral pinions are rotatably mounted to said carrier.

13. An automatic transmission mechanism portion as claimed in claim 10, wherein the integral pinions are rotatably mounted to said carrier.

* * * * *